United States Patent [19]

Fukuhara et al.

[11] 4,174,894
[45] Nov. 20, 1979

[54] TTL METERING DEVICE IN A SINGLE LENS REFLEX CAMERA

[75] Inventors: Toru Fukuhara, Fujisawa; Jun Shimomura, Tokyo, both of Japan

[73] Assignee: Nippon Kogaku K.K., Tokyo, Japan

[21] Appl. No.: 890,967

[22] Filed: Mar. 28, 1978

Related U.S. Application Data

[63] Continuation of Ser. No. 716,936, Aug. 23, 1976.

[30] Foreign Application Priority Data

Sep. 1, 1975 [JP] Japan .......................... 50-119221[U]
Sep. 5, 1975 [JP] Japan ............................. 50-107099

[51] Int. Cl.² ............................................ G03B 7/00
[52] U.S. Cl. ..................................... 354/59; 354/152; 354/227
[58] Field of Search ................. 354/23 R, 42, 49, 53, 354/54, 55, 56, 57, 59, 152, 227

[56] References Cited

U.S. PATENT DOCUMENTS

| | | | |
|---|---|---|---|
| 3,332,330 | 7/1967 | Broschke et al. | 354/55 |
| 3,429,246 | 2/1969 | Ebertz | 354/55 |
| 3,468,233 | 9/1969 | Schmidt | 354/55 |
| 3,523,497 | 8/1970 | Holle | 354/55 |
| 3,540,363 | 11/1970 | Ono | 354/55 |
| 3,559,551 | 2/1971 | Ono | 354/55 |
| 3,699,864 | 10/1972 | Shimomura | 354/23 R |
| 3,779,146 | 12/1973 | Trankner | 354/23 R |
| 3,994,001 | 11/1976 | Maitani et al. | 354/23 R |

FOREIGN PATENT DOCUMENTS

| | | | |
|---|---|---|---|
| 2056239 | 5/1971 | Fed. Rep. of Germany | 354/42 |
| 2031155 | 1/1972 | Fed. Rep. of Germany | 354/23 R |
| 1344571 | 1/1974 | United Kingdom | 354/152 |

*Primary Examiner*—Russell E. Adams
*Attorney, Agent, or Firm*—Fitzpatrick, Cella, Harper & Scinto

[57] ABSTRACT

A TTL metering device in a single lens reflex camera for measuring light passed through the picture-taking objective lens of the camera comprises a light-sensing element for receiving the light passed through the picture-taking objective lens to produce an output corresponding to the intensity of the light, a jump-up mirror having a light-transmitting area through which the light may be transmitted, and diffusion means for permitting the light transmitted through the light-transmitting area of the jump-up mirror to reach the light-sensing element.

11 Claims, 16 Drawing Figures

FIG. 6-III

TTL METERING DEVICE IN A SINGLE LENS REFLEX CAMERA

This is a continuation, of application Ser. No. 716,936 filed Aug. 23, 1976.

BACKGROUND OF THE INVENTION

1. Field of the Invention

This invention relates to a metering device in a single lens reflex camera for measuring light passed through the picture-taking objective lens of the camera, and more particularly to a TTL metering device which has a light-sensing element and a jump-up mirror partly provided with an area through which light may be transmitted (hereinafter referred to as the light-transmitting area) so that the light passed from the picture-taking objective lens through the light-transmitting area may be directed to the light-sensing element to effect metering.

In conventional TTL metering devices of this type, an auxiliary mirror comprising a small plane mirror or a small curved mirror has been used to cause the light passed from the picture-taking objective lens through the light-transmitting area to be directed to the light-sensing element. However, in order that the metering range may be expanded, it has been necessary to enlarge the auxiliary mirror or to provide a large-diametered image forming lens in the metering optical system leading from the auxiliary mirror to the light-sensing element. This has in turn led to an increased space requirement and consequent larger size and increased weight of the camera. In addition, the larger size of the auxiliary mirror has increased the weight of the movable portion of the camera during shutter release.

SUMMARY OF THE INVENTION

It is an object of the present invention to provide a TTL metering device which enables the metering range to be expanded without any increase in the weight of and the space occupied by the auxiliary mirror and the metering optical system.

It is another object of the present invention to provide such a TTL metering device which also readily permits the portion to be weighted in metering that is, the degree of preference in metering to be chosen as desired.

It is still another object of the present invention to provide such a TTL metering device which can also minimize the drop of sensitivity resulting from the expansion of the metering range.

According to the present invention, the TTL metering device for measuring light passed through the picture-taking objective lens comprises a light-sensing element for receiving the light passed through the picture-taking objective lens to produce an output corresponding to the intensity of the light, a jump-up mirror partly provided with a light-transmitting area through which the light may be transmitted, and light diffusion means for diffusing the light passed from the picture-taking objective lens through the light-transmitting area of the jump-up mirror to thereby permit the light to reach the light-sensing element.

The light diffusion means may be a diffusive reflector member formed with a regularly concavo-convex surface having a predetermined diffusing characteristic.

Further, the light diffusion means may comprise light scattering means including a layer of an electro-optical substance and control means for applying a voltage to the light scattering means to vary the scattering characteristic thereof.

Thus, in accordance with the present invention, there is provided a TTL metering device which permits the metering range and the degree of preference in metering to be chosen as desired without any increase in the weight of and the space occupied by the auxiliary mirror and the metering optical system.

Further, in accordance with the present invention, there is provided a TTL metering device which can minimize the drop of sensitivity resulting from the expansion of the metering range.

The above objects and other features of the present invention will become fully apparent from the following detailed description of some embodiments of the invention taken in conjunction with the accompanying drawings.

BRIEF DESCRIPTION OF THE DRAWINGS

FIG. 5-I is a plan view of the diffusive reflector member according to another embodiment of the present invention.

FIG. 5-II is a cross-sectional view taken along line A-A' in FIG. 5-I.

FIGS. 6-I to 6-IV illustrate the differences in sensitivity distribution resulting from different configurations of the reflecting surface of the auxiliary mirror.

FIG. 9-I is a plan view for illustrating the planar pattern configuration of the diffusive reflector member.

FIG. 9-II is a cross-sectional view taken along line X-X' in FIG. 9-I.

FIG. 10-I is a plan view for illustrating the three-dimensional pattern configuration of the diffusive reflector member.

FIG. 10-II is a cross-sectional view taken along line Y-Y' in FIG. 10-I.

DESCRIPTION OF THE PREFERRED EMBODIMENTS

Figure 1:
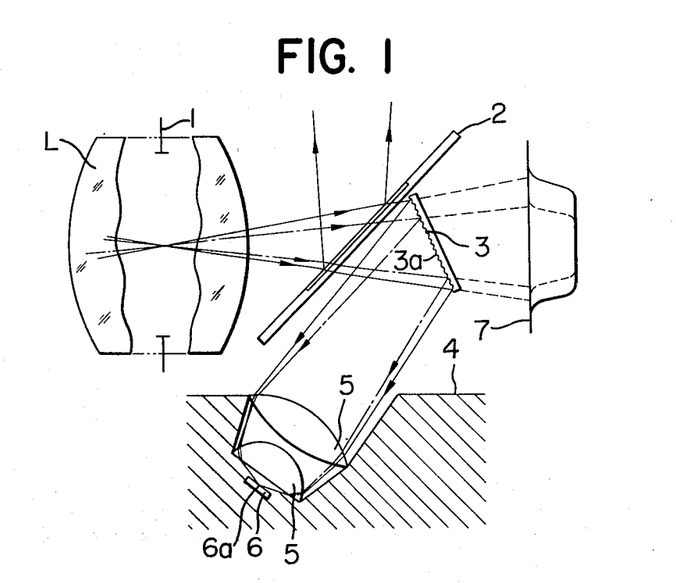
FIGS. 1 and 3 are vertical cross-sectional views of essential portions of an embodiment of the present invention.

Referring to FIG. 1 which is a vertical cross-section of essential portions of an embodiment of the present invention taken along a plane containing the optical axis of a jump-up mirror 2 is rotatably movable between a first position where the light passed through the exit pupil 1 of the objective lens L is reflected by the mirror 2 toward a view finder optical system disposed above the mirror although not shown, and a second position where the mirror is raised out of the picture-taking optical path so that the light passed through the objective lens may reach a film surface 7. The jump-up mirror 2 has at its central portion a light-transmitting area. A diffusive reflector member 3 formed integrally to a known movable member (not shown), is supported to the jump-up mirror 2. The movable member of the diffusive reflector member 3, when the mirror is located in the first position, is opposed to a light-sensing element 6 disposed in the bottom 4 of a mirror box, as shown. By the releasing operation of the shutter, the jump-up mirror is rotated to the second position and in association therewith the diffusive reflector member 3 is receded from the picture-taking light path and covers the light-transmitting area of the jump-up mirror 2, so that inverse incident light from an eyepiece (not shown) is intercepted and fogging or the like of photographic film is prevented.

Figure 2:
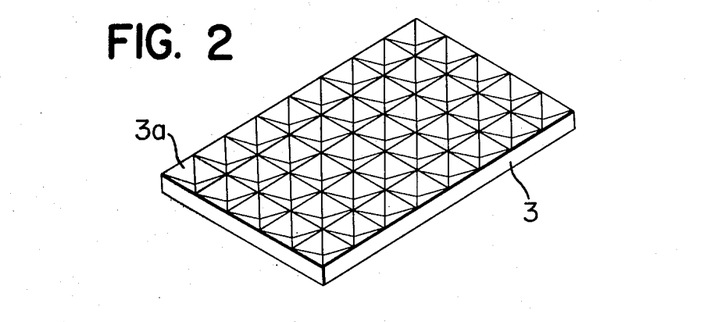
FIG. 2 is a perspective view of the diffusive reflector member according to an embodiment of the present invention.

The reflecting surface 3a of the diffusive reflector member 3 is regularly formed with pyramid-shaped hollows or unevenness as shown in FIG. 2 so that the transmitting light is diffusively reflected by the reflecting surface 3a and condensed on the light-receiving surface 6a of a light-sensing element 6 by a condenser lens 5 disposed at the bottom 4 of a mirror box and forwardly of the light-sensing element.

Now consider the light ray passed through the center of the exit pupil 1 of the picture-taking objective lens L to the light-receiving surface 6a of the light-sensing element 6.

If the auxiliary mirror were a plane mirror as was conventional, the light condensed on the light-receiving surface 6a by the condenser lens 5 would be within the range indicated by dot-and-dash lines.

In contrast, if the auxiliary mirror is the diffusive reflector member 3, the light within the range indicated by solid lines will be condensed on the light-receiving surface 6a. The reason why the diffusive reflector member 3 provides a wider range of condensed light than the plane mirror is that since the diffusive reflecting surface 3a can be regarded as having two reflecting surfaces provided by slightly tilting the reflecting surface of said plane mirror upwardly and downwardly, even the light rays having angles of incidence which would not be permitted to enter the condenser lens by the plane mirror can also be directed to the condenser lens 5. Now, in FIG. 1, extend the solid and the dot-and-dash lines rearwardly of the auxiliary mirror 3 until these lines intersect the film surface 7 at points as indicated on the right-hand side of FIG. 1. Since, as already described, the diffusive reflector member 3 permits light rays having greater angles of incidence with respect to the optical axis of the picture-taking objective lens to reach the light-receiving surface 6a of the light-sensing element than when the plane mirror is used, it will be seen that the said points of intersection correspond to positions of the film surface 7 which are remotor from the center of the picture plane, thus permitting a wider range of light reception.

In the present embodiment, the diffusive reflecting surface 3a comprises pyramid-shaped hollows or unevenness and this is equivalent to a combination of multiple tiny plane mirrors which may be classified into four different types of inclinations, so that the range of light reception is likewise widened also to the left and right.

Figure 3:
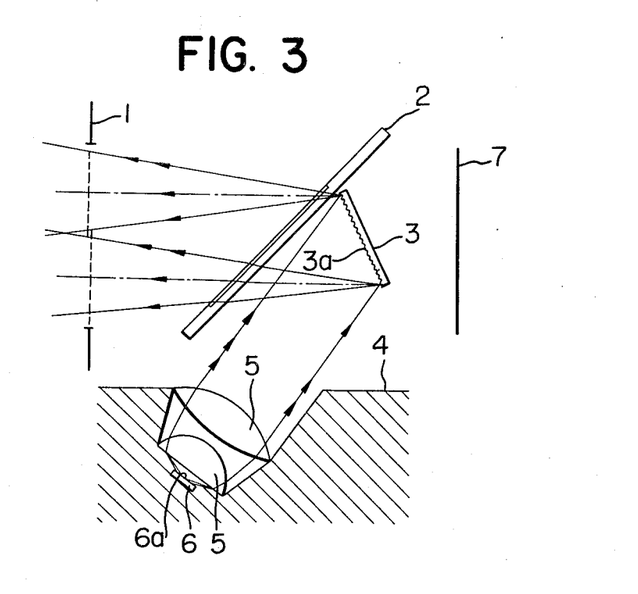

Next, consider the condition as shown in FIG. 3 wherein the light path is traced in the opposite direction to the direction of incidence of light, namely, light is projected from the light-receiving surface 6a of the light-sensing element 6 back to the surface of the exit pupil 1 of the picture-taking lens.

Figure 4:
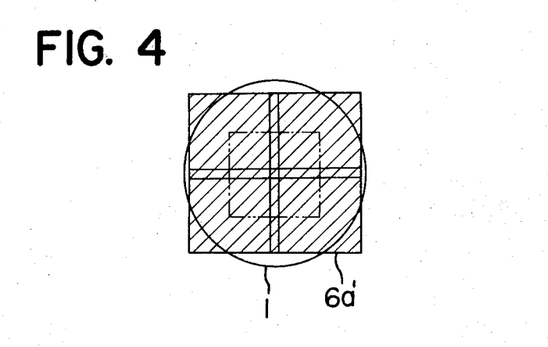
FIG. 4 is a view showing the light-receiving surface of the light sensing element as projected upon the exit pupil of the picture-taking objective lens.

In the case of the diffusive reflecting surface 3a which is regularly rugged, light is projected upon upper portions of the exit pupil 1 by the upwardly inclined reflecting surfaces of the diffusive reflector member and upon lower portions of the exit pupil 1 by the downwardly inclined reflecting surfaces of the diffusive reflector member. FIG. 4 shows the light-receiving surface 6a as projected upon the exit pupil 1. It is seen that the use of the diffusive reflecting surface 3a, as compared with the use of the plane mirror (dot-and-dash line), expands the light in all directions so that the light covers almost all area of the exit pupil 1. In other words, the light-sensing element 6 receives the light from the full area of the exit pupil 1 and can thus minimize the drop of the sensitivity output which would result from the use of the diffusive reflecting surface.

In contrast, if the diffusive reflecting surface were irregularly rugged, the metering range could be widened but the sensitivity output would drop and this would be useless for an exposure meter.

Figures 1, 6:
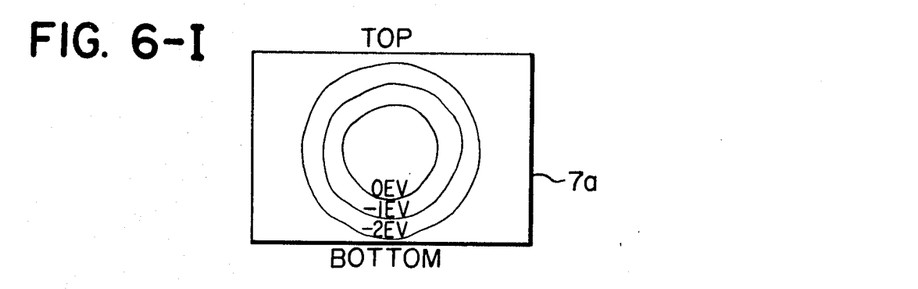
Figures 2, 6:
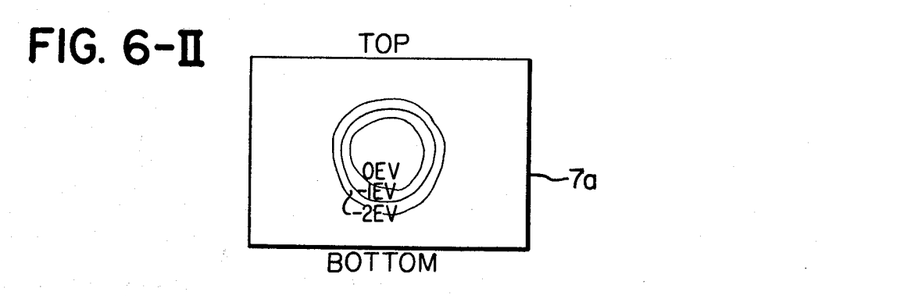
Figures 3, 6:
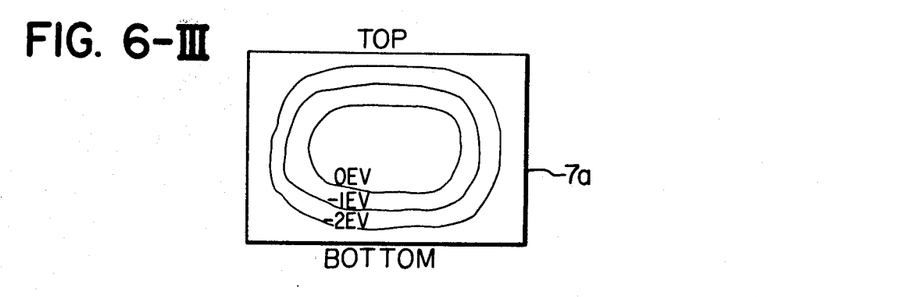
Figures 4, 6:
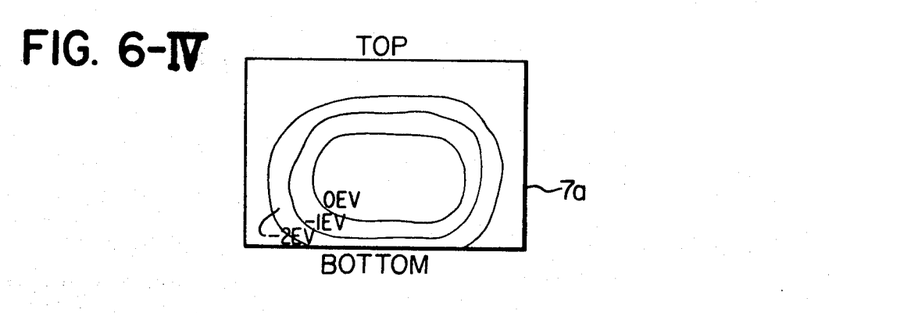

The sensitivity distribution provided by the diffusive reflector member 3 of the present embodiment will now be observed. As illustrated in FIG. 6-I, the sensitivity area relative to the picture plane 7a is considerably widened and the metering range is correspondingly widened. Such sensitivity distribution is indicated by relative exposure values EV which may be determined by focusing a spot light source at various points on the picture plane, and measuring the output of the light-sensing element each time. OEV is the point whereat the sensitivity is highest in accordance with the result of the measurement.

Incidentally, FIG. 6-II illustrates the sensitivity distribution provided when the conventional plane mirror is used as the auxiliary mirror. It shows that the relative sensitivity area is considerably narrow with respect to the entire area of the picture plane 7a and the metering range is correspondingly narrow.

It should be noted that the configuration of the diffusive reflecting surface need not always be vertically and horizontally symmetrical as in the above-described first embodiment, but may be selected as intended.

Figures 1, 5:
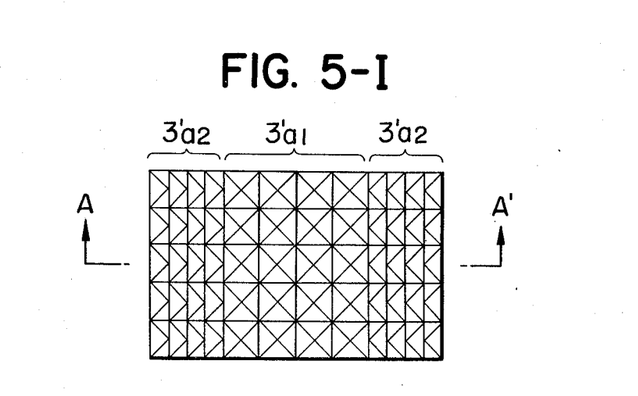
Figures 2, 5:
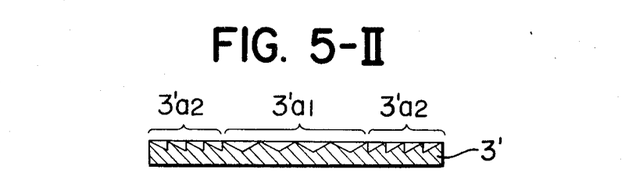

FIGS. 5-I and 5-II show another embodiment of the diffusive reflector member 3. In this embodiment, the left and right diffusive reflecting surfaces $3'a_2$ and the middle diffusive reflecting surfaces $3'a_1$ differ in configuration of unevenness and accordingly in diffusing characteristic. In this embodiment, the light incident from the left and right is efficiently condensed upon the light-sensing element 6 so that the sensitivity distribution and the metering range are widened substantially over the entire area of the picture plane 7a.

In the embodiments described hitherto, the high sensitivity portion is coincident with the center portion of the picture plane 7a, but the high sensitivity portion may simply be deviated toward the bottom as shown in FIG. 6-IV so that metering may not take place for any excess portion of the top.

More specifically, the reflecting surface of the auxiliary mirror 3 or 3' may take the form of any other polygonal cone other than the pyramid, prism, Fresnel prism or other, or partial combination of their reflecting surfaces, so that the degree of preference of the metering (sensitivity distribution) can be selected as desired.

The auxiliary mirror 3 or 3' may be shaped by the use of plastics and if evaporation is provided on the reflecting surface thereof, exact surface configuration may be produced excellently on a mass production scale.

Figure 7:
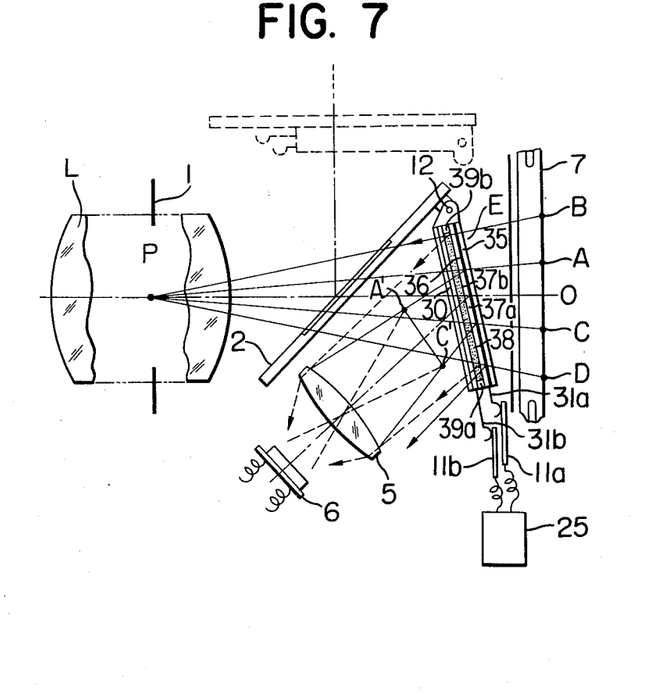
FIG. 7 is a vertical cross-sectional view of essential portions of another embodiment of the present invention.

Referring to FIG. 7 which shows still another embodiment of the present invention, the jump-up mirror 2 is constructed as already noted and part of the light passed through the light-transmitting area of that mirror is projected upon light scattering means E. This light scattering means E comprises a support 35, a plane mirror 36, two transparent electrodes 37a and 37b, a layer of liquid crystal 38, spacers 39a and 39b for maintaining the spacing between the electrodes 37a and 37b and for insulating these two electrodes from each other, and a cover glass 30. External electrodes 31a and 31b are capable of contacting terminals 11a and 11b for applying therethrough a voltage from the outside and are connected with the transparent electrodes 37a and 37b.

The jump-up mirror 2 and the light scattering means E are connected together by a pivot 12 and during metering, they assume their positions as shown by solid lines and during photography, they assume their positions as shown by dotted lines in which they are both retracted from the picture-taking optical path. The electrodes 31a and 31b are in contact with the terminals 11a and 11b only during metering. Control means 25 serves to control the voltage applied between the transparent electrodes 37a and 37b and vary the direction of the light incident on the plane mirror 36 and the direction of the light reflected thereby. The light reflected by the light scattering means E is condensed on the light-receiving surface of the light-sensing element 6 of the metering device.

Operation of the present embodiment will now be described.

During metering, when there is no voltage applied between transparent electrodes 37a and 37b, the layer of liquid crystal 38 is substantially transparent as is well-known. Thus, the light scattering means E is merely performing the function of the plane mirror 36. More specifically, a conjugate image of an area of the film surface 7 which corresponds to the metering range AC is formed at A'C' by the plane mirror 36, and such image is directed to the light-sensing element 6 by the condenser lens 5. When this occurs, the light rays directed toward points B and D on the film surface 7 never enter the condenser lens 5 and thus, the metering range is within the range AC.

When a voltage is applied between the transparent electrodes 37a and 37b, the action of scattering takes places in the layer of liquid crystal 38. As the result, the light passing through the center P of the exit pupil of the picture-taking objective lens L toward the points B and D on the film surface 7 is scattered by the layer of liquid crystal 38 and deflected toward the condenser lens 5. The deflected light is thence directed to the photosensitive element 6 by the condenser lens. Thus, the metering range is widened to the range B–D.

Figure 8:
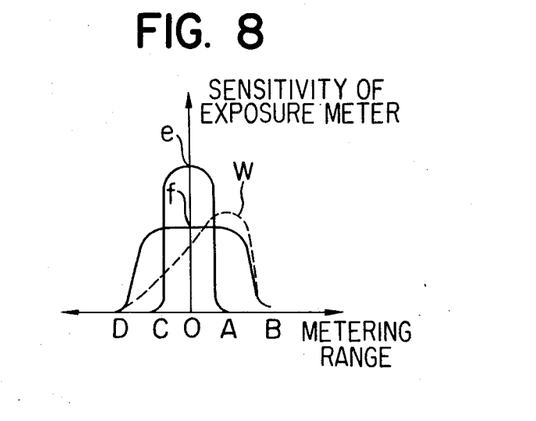
FIG. 8 illustrates the sensitivity distribution in the embodiment of FIG. 7.

FIG. 8 illustrates the curves of sensitivity distribution of the metering device. In this graph, A, B, C, D and O represent the respective points on the film surface 7 shown in FIG. 7.

The sensitivity levels of the metering device resulting from change in the metering range (see e and f in FIG. 8) are determined by the choice of the liquid crystal substance and in relation to the magnitude, frequency, etc. of the applied voltage, but the correction of the sensitivity levels may be suitably associated with the conventional metering device sensitivity correction means.

It will be seen in FIG. 7 that if the diffusive characteristic of the light in the marginal portion of the light scattering means E is increased, the range of metering on the film surface 7 will be widened. Therefore, if the light scattering means is constructed as shown in FIGS. 9-I, 9-II, 10-I and 10-II, the sensitivity characteristic of the metering device may be reduced, for example, for the light from the top portion as indicated by curve W in FIG. 8.

Figures 1, 9:
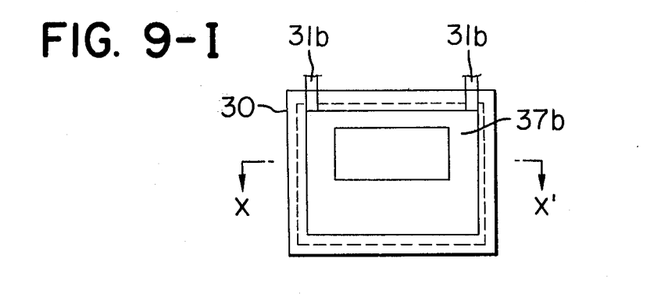
Figures 2, 9:
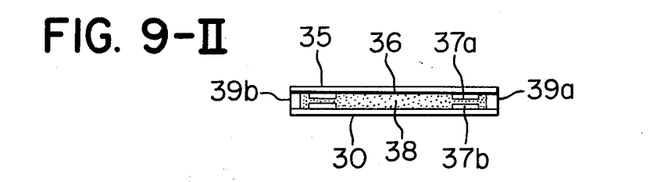

In FIGS. 9-I and 9-II, the transparent electrodes 37a and 37b are in such a planar pattern that they are provided in the marginal portion of the light scattering means E and absent in the central portion thereof. When a voltage is applied to these transparent electrodes, the scattering characteristic intensely occurs only in the marginal portion and hardly occurs in the central portion.

Figures 1, 10:
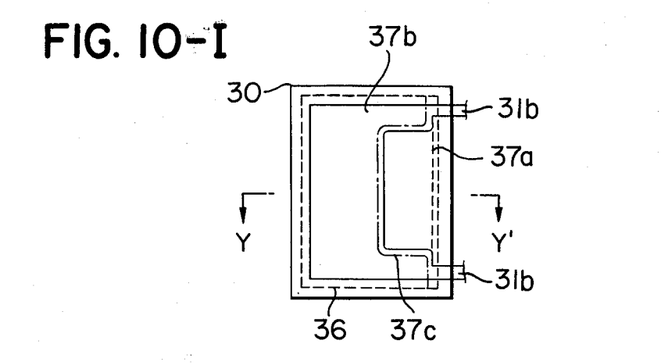
Figures 2, 10:
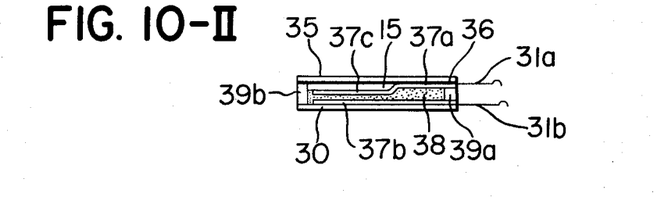

In FIGS. 10-I and 10-II, one transparent electrode 37a is attached to the plane mirror 36 with a layer of transparent substance 15 interposed between a portion 37c of the transparent electrode 37a and the plane mirror. Thus, the layer of electro-optical substance 38 is smaller in thickness in the portion thereof which is between the transparent electrodes 37c and 37b than in the portion thereof which is between the transparent electrodes 37b and 37a. When a voltage is applied to these transparent electrodes an electric field of greater intensity is produced in the area wherein the transparent electrodes 37c and 37b are opposed to each other, so that the action of scattering is locally intensified.

The light scattering means E of the present invention employs liquid crystal as the substance presenting the scattering characteristic, whereas this is not restrictive but use may be made of any electro-optical substance which will deflect light upon application of a voltage thereto.

We claim:

1. A TTL metering device in a single lens reflex camera for measuring light passed through the picture-taking objective lens of the camera, comprising:
   a light-sensing element for receiving the light passed through said picture-taking objective lens and producing an output corresponding to the intensity of the light;
   a jump-up mirror partly having a light-transmitting area through which part of the light passed through said picture-taking objective lens may be transmitted;
   light diffusion means being positioned behind said jump-up mirror and diffusively reflecting the light transmitted through said light-transmitting area of said jump-up mirror to permit said light to reach said light-sensing element; and
   optical means disposed between said light diffusion means and said light-sensing element;
   said light diffusion means including:
   light scattering means including a layer of electro-optical substance; and
   control means for applying a voltage to said light scattering means to vary the scattering characteristic thereof.

2. A TTL metering device according to claim 1, wherein said light scattering means comprises:
   a support;
   a plane mirror disposed on said support;
   two transparent electrodes to which a voltage is applied by said control means, one of said transparent electrodes being disposed on said plane mirror;
   a spacer for maintaining a spacing between said two transparent electrodes and for insulating these electrodes from each other; and a layer of electro-optical substance filling at least the space between said electrodes.

3. A TTL metering device according to claim 2, wherein said light scattering means is such that the planar pattern configurations of said two transparent electrodes are made to locally differ, whereby the scattering characteristic of said electro-optical substance during application of the voltage may be varied from location to location.

4. A TTL metering device according to claim 2, wherein said light scattering means is such that the three-dimensional configuration of at least one of said two transparent electrodes is made to locally differ and the thickness of said layer of electro-optical substance is made to locally differ, whereby the scattering characteristic of said layer during application of the voltage may be varied from location to location.

5. A TTL metering device in a single lens reflex camera for measuring light passed through the picture-taking objective lens of the camera, comprising:
- a light-sensing element for receiving the light passed through the picture-taking objective lens and producing an output corresponding to the intensity of the light;
- a jump-up mirror being rotatably movable between a first position where the light passed through the objective lens is reflected toward a view finder optical system and a second position where said mirror is raised so that said light may reach the film plane, said jump-up mirror partly having a light-transmitting area through which part of said light may be transmitted toward the film plane when said jump-up mirror is in said first position;
- light diffusion means having a diffusive reflection surface which is composed of regularly arranged multiple mirrors of directionally different reflecting characteristics, each of said mirrors reflecting the light passed through the objective lens directly to said light-sensing element;
- said light diffusion means being disposed behind said jump-up mirror, said light diffusion means when said jump-up mirror is in said first position, being so inclined with respect to said jump-up mirror that said light-sensing element and the diffusive reflection surface of said light diffusion means may be in a predetermined opposed relation, and said light diffusive means when said jump-up mirror is in said second position is receded from the light path;
- whereby when said jump-up mirror is in the first position the light passed through said lens and light-transmitting area is diffusively reflected by the diffusive reflection surface of said light diffusion means and reaches said light-sensing element.

6. A metering device according to claim 5, further comprising optical means disposed between said light diffusion means and said light-sensing element.

7. A metering device according to claim 6, wherein each of said mirrors in a plane morror.

8. A metering device according to claim 7, wherein said mirrors are each pyramid-shaped and regularly arranged.

9. A metering device according to claim 7, wherein said mirrors have such diffusing characteristics that the pattern of the light-receiving surface of said light-sensing element as projected on the exit pupil of said picture-taking objective lens by said optical means and said mirrors substantially cover the entire area of the exit pupil.

10. A TTL metering device in a single lens reflex camera for measuring light passed through the picture-taking objective lens of the camera, comprising:
- a light-sensing element for receiving the light passed through said objective lens and producing an output corresponding to the intensity of the light incident thereon;
- a jump-up mirror being rotatably movable between a first position where the light passed through the objective lens is reflected toward a view finder optical system and a second position where the jump-up mirror is raised out of the light path to guide said light to the film plane, said jump-up mirror having partly a light-transmitting area through which part of said light passes to the film plane;
- light scattering means for diffusively reflecting the light passed through said light transmitting area, said light scattering means including a layer of electro-optical substance whose diffusing characteristic varies according to voltage applied thereto and being disposed behind said jump-up mirror, said light scattering means when said jump-up mirror is in said first position, being inclined with respect to said jump-up mirror and being in a predetermined opposed relation to said light sensing element, and said light scattering means when said jump-up mirror is in said second position, being receded from said light path; and
- means for applying a voltage to the layer of said electro-optical substance to vary said scattering characteristic when said jump-up mirror is in said first position; whereby when said jump-up mirror is in said first position the light passed through said objective lens and light transmitting area is diffusively reflected by said light scattering means and reaches said light sensing element.

11. A metering device according to claim 5, wherein said multiple mirrors in a central portion of the diffusive reflection surface are arranged in a first configuration and said multiple mirrors in the remaining portion fo the diffusive reflection surface are arranged in a second configuration.

* * * * *

UNITED STATES PATENT AND TRADEMARK OFFICE
CERTIFICATE OF CORRECTION

PATENT NO. : 4,174,894
DATED : November 20, 1979
INVENTOR(S) : TORU FUKUHARA, ET AL It is certified that error appears in the above—identified patent and that said Letters Patent are hereby corrected as shown below:

Col. 2, line 57, after "of" insert --the picture-taking objective lens,--.

Col. 8, line 2, change "in" to --is--.

Signed and Sealed this

*Twenty-fifth* Day of *March 1980*

[SEAL]

*Attest:*

SIDNEY A. DIAMOND

*Attesting Officer*   *Commissioner of Patents and Trademarks*